(12) United States Patent
Price

(10) Patent No.: US 7,412,973 B2
(45) Date of Patent: Aug. 19, 2008

(54) FUEL VAPORIZER

(76) Inventor: Ron Price, 150 Campbell, Pasadena, TX (US) 77502

( * ) Notice: Subject to any disclaimer, the term of this patent is extended or adjusted under 35 U.S.C. 154(b) by 0 days.

(21) Appl. No.: 11/729,403

(22) Filed: Mar. 28, 2007

(65) Prior Publication Data

US 2007/0169761 A1    Jul. 26, 2007

(51) Int. Cl.
*F02M 31/00* (2006.01)
(52) U.S. Cl. ................................. 123/538; 123/549
(58) Field of Classification Search ............ 123/538, 123/543–557
See application file for complete search history.

(56) References Cited

U.S. PATENT DOCUMENTS

| | | | | |
|---|---|---|---|---|
| 4,267,976 A | * | 5/1981 | Chatwin | 239/102.2 |
| 4,344,404 A | * | 8/1982 | Child et al. | 123/538 |
| 4,378,001 A | * | 3/1983 | Takeda et al. | 123/445 |
| 4,524,746 A | * | 6/1985 | Hansen | 123/538 |
| 4,862,858 A | * | 9/1989 | Goldsberry | 123/538 |
| 5,000,152 A | * | 3/1991 | McCauley | 123/536 |
| 5,722,588 A | * | 3/1998 | Inoue et al. | 237/12.3 C |
| 2004/0045533 A1 | * | 3/2004 | Sukegawa et al. | 123/478 |

* cited by examiner

Primary Examiner—M. McMahon
(74) Attorney, Agent, or Firm—Micahel Ries

(57) ABSTRACT

The present invention is a fuel vaporizer that will greatly increase power and economy in fuel powered engines while producing far less pollution. The present invention has a fuel chamber, air inlet, vibrator and heating element that aerate fuel by vibrating and heating the fuel from a liquid to a more combustible gaseous vapor.

4 Claims, 2 Drawing Sheets

FUEL VAPORIZER

This application claims priority to U.S. Utility Application Ser. No. 11/127,323 filed Jul. 6, 2005, the entire disclosure of which is herein incorporated by reference.

TECHNICAL FIELD & BACKGROUND

The present invention generally relates to the field of fuel vaporizers. More specifically, the present invention relates to a fuel vaporizer that will greatly increase power and economy in fuel powered engines while producing far less pollution.

There is a need for conserving gas while increasing power and creating less pollution. The present invention has a fuel chamber, air inlet and heating element that aerate fuel by vibrating and heating the fuel from a liquid to a more combustible gaseous vapor. Other designs use many moving parts that can breakdown also heat is used but they do not use vibration to complete the vaporization process. Other attempts at vaporization make the mistake of saying that vapors are dry, this in not correct because they are damp. Before the computer age another attempt at vaporization was a float. The present invention includes heat, air, and vibration along with being usable at any angle compared to another design that attempts vaporization with heat only and a fuel level that would fail at extreme angles.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
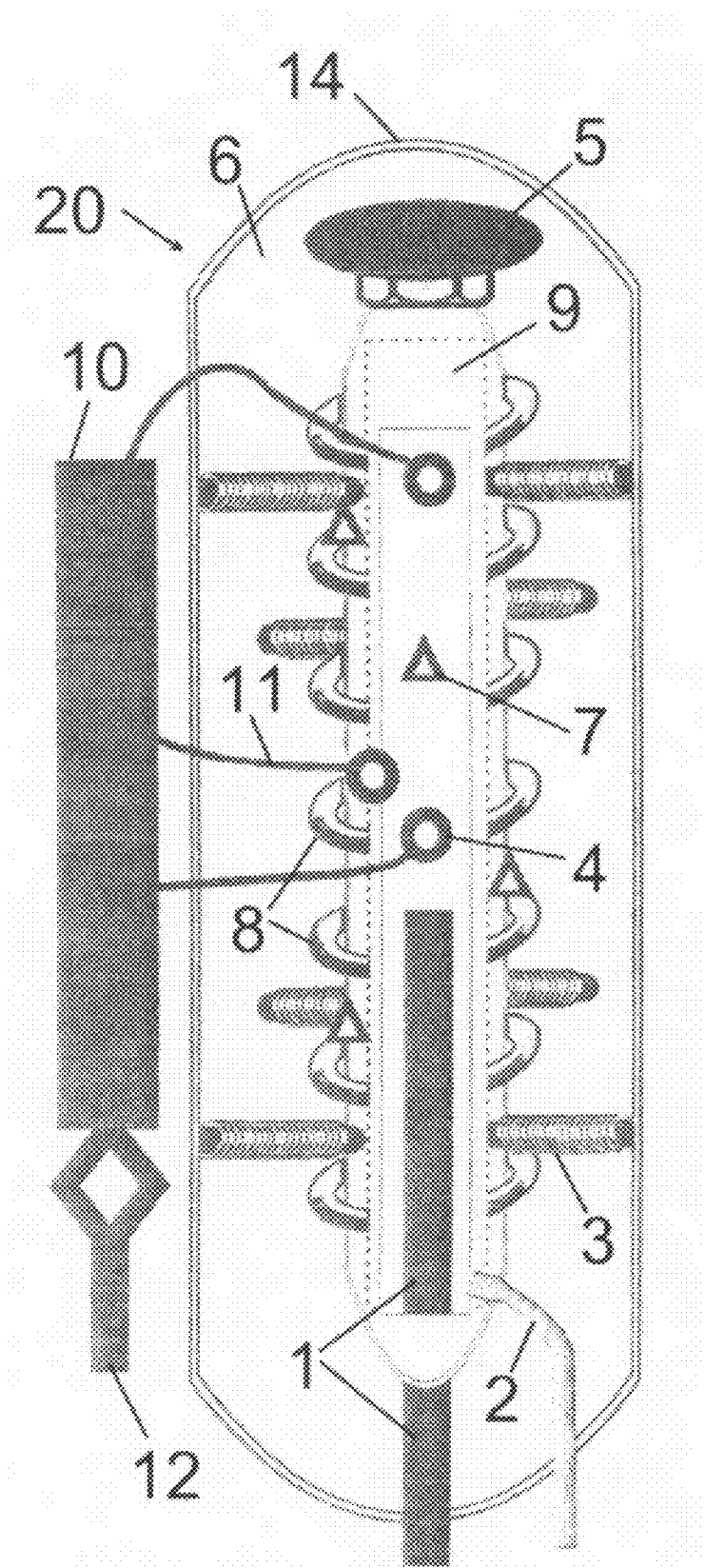
FIG. 1 is a side view with an inner core sectioned of a fuel vaporizer in accordance with one embodiment of the present invention.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation. The phrase in one embodiment is used repeatedly. The phrase generally does not refer to the same embodiment, however, it may. The terms comprising, having and including are synonymous, unless the context dictates otherwise.

A fuel vaporizer has a fuel chamber or inner core, an air intake, and a heating element that aerates fuel by vibrating and heating it from a liquid to a more combustible gaseous vapor. The more combustible gaseous vapor conserves gas while creating higher power and produces far less pollution all from the vaporization process. The intake manifold houses the inner core. Fuel or gas is introduced into the system's inner core by a computerized means to control the proper amount to be vaporized.

Fuel will be vaporized and excess fuel is returned to a tank. The amount of fuel vaporized and released in the manifold is controlled with the computerized inlet valves being set to the pressure of the CFM or cubic feet per minute. This mean less pressure will open for more vaporized fuel or pressing the gas petal gets more vaporized fuel. Excess fuel or excess gas recirculation EGR can be temporarily contained in a charcoal container to be recirculated after liquidized back to the tank.

The heating element in combination with the vibrator that produces a shaker effect promotes the vaporization process and creates the vaporized fuel. The spring mounts keep the inner core suspended to keep the vibrating consistent. An air inlet valve of the air intake, also computerized, brings air into the inner core the vaporization occurs in the inner core before it enters the manifold by computerized outlet valves or fuel pressure valves. There are multiple computerized pressure valves that regulate the release of excess vapors within the intake manifold which are recirculated back into the fuel supply. The vapors from the inner core are computably introduced to the engine from within the intake when the fuel pressure valves open and allow the vaporized fuel to enter the intake manifold.

Referring now to FIG. 1, a fuel vaporizer 20 is shown with an inner core 9 that is supplied by an air intake 1 and fuel line 2. The inner core 9 has multiple off-set openings or fuel pressure valves 7 that are computerized to open only when submerged in fuel. This allows the fuel vaporizer 20 to work at any angle for example steep grades and angles dealt with by four wheel drive vehicles in mountainous regions or airplanes. The fuel line 2 feeds fuel to the inner core 9 to a particular fuel level. A computerized system maintains the inner core 9 to a fuel level of approximately half full leaving room for vaporization action to happen. The fuel is vibrated by an electric vibrator 5 with the inner core 9 being suspended on spring mounts 3. The electric vibrator 5 may be an electrical vibration motor.

Figure 2:
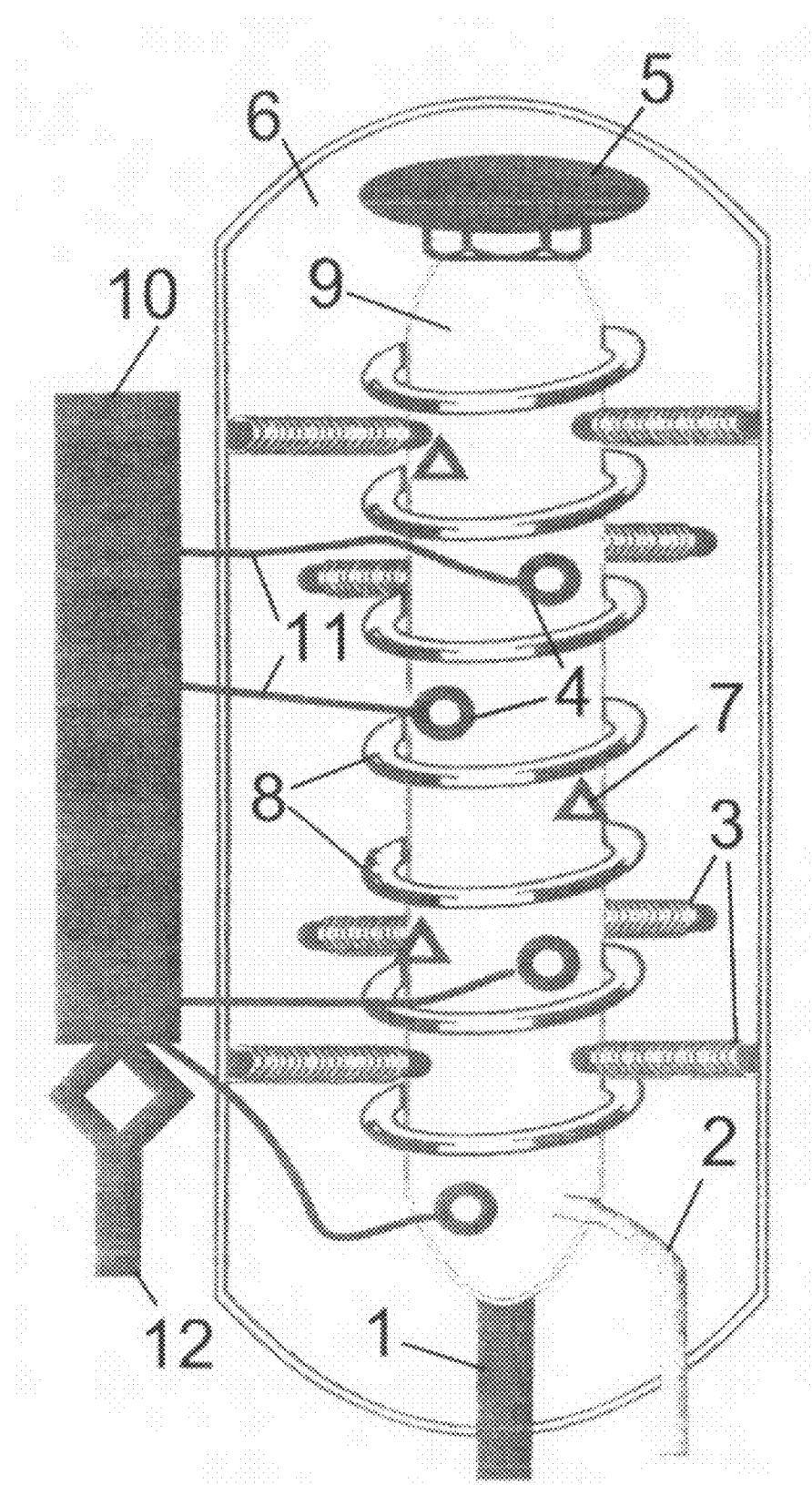
FIG. 2 is a side view of a fuel vaporizer in accordance with one embodiment of the present invention.

In FIG. 1 the inner core 9 also has safety pressure valves 4 computerized so when excessive pressure exists the contents of the inner core 9 are sent to a condenser 10 to turn excessive vapors back to liquid which is returned to fuel tank 12. An intake manifold 6 creates an outer chamber 14. The outer chamber 14 is where the vapors collect immediately before being transferred into the cylinders of an internal combustion engine by way of the intake manifold 6. The inner core 9 has multiple valves such as the fuel pressure valve 7 that are computerized to release vapors when correct pressure is achieved. A heating element 8 further adds to the vaporizing of the fuel. The inner core 9 is the fuel chamber that contains the fuel vaporization processes. The combination of vibration from the electric vibrator 5 and heat from the heating element 8 produce vaporized fuel. Overflow tubes 11 in conjunction with the safety pressure valves 4 carry excessive vapors to the condenser 10 to be re-liquefied and returned to the fuel tank 12. The shape of the invention is irrelevant and can be changed to suit any particular needs. In FIG. 2 the inner core 9 is not sectioned to show the heating elements 8 winding all the way around the inner core 9.

While the present invention has been related in terms of the foregoing embodiments, those skilled in the art will recognize that the invention is not limited to the embodiments depicted.

The present invention can be practiced with modification and alteration within the spirit and scope of the appended claims. Thus, the description is to be regarded as illustrative instead of restrictive on the present invention.

What is claimed is:

1. A fuel vaporizer comprising:
   an intake manifold
   an inner core inside the intake manifold, the inner core having an air intake and a fuel line;
   a heating element winding around the inner core;
   a vibrator connected to the inner core, the heating element and vibrator are both activated together to produce vaporized fuel inside the inner core;
   at least one fuel pressure valve on the inner core to supply the vaporized fuel to the intake manifold, the fuel pressure valve placed on the inner core in an offset pattern to allow the fuel vaporizer to function in any position;
   at least one safety pressure valve on the inner core to release excess vapors to a condenser by way of at least one overflow tube.

2. The device of claim 1 wherein the vibrator has an electrical motor.

3. A fuel vaporizer comprising:
   an intake manifold attached to the fuel vaporizer;
   an inner core inside the intake manifold, the inner core having an air intake and a fuel line;
   a heating element winding around the inner core;
   a vibrator connected to the inner core at one end of the inner core, the vibrator and heating element are activated at the same time to heat and vibrate contents of the inner core at the same time to produce a vaporized fuel;
   at least one fuel pressure valve on the inner core to supply vaporized fuel to the intake manifold, the fuel pressure valve placed on the inner core in an offset pattern to allow the fuel vaporizer to function in any position;
   at least one safety pressure valve on the inner core to release excess vapors; and
   at least one overflow tube that connects the safety pressure valve to a condenser.

4. The device of claim 3 wherein the vibrator has an electrical motor.

* * * * *